(12) United States Patent
Callanan

(10) Patent No.: US 9,934,822 B2
(45) Date of Patent: Apr. 3, 2018

(54) ONLINE VIDEO DISTRIBUTION

(71) Applicant: WireWax Limited, London (GB)

(72) Inventor: Steven James Callanan, London (GB)

(73) Assignee: WireWax Limited, London (GB)

( * ) Notice: Subject to any disclaimer, the term of this patent is extended or adjusted under 35 U.S.C. 154(b) by 314 days.

(21) Appl. No.: 14/482,130

(22) Filed: Sep. 10, 2014

(65) Prior Publication Data

US 2014/0376883 A1 Dec. 25, 2014

Related U.S. Application Data

(62) Division of application No. 13/948,268, filed on Jul. 23, 2013, now abandoned.

(30) Foreign Application Priority Data

Jul. 23, 2012 (GB) .................................. 1213015.9

(51) Int. Cl.
| | | |
|---|---|---|
| H04N 7/173 | (2011.01) | |
| G11B 27/30 | (2006.01) | |
| G06F 17/30 | (2006.01) | |
| H04N 21/434 | (2011.01) | |
| H04N 21/4725 | (2011.01) | |
| H04N 21/858 | (2011.01) | |
| H04N 7/025 | (2006.01) | |
| G11B 27/036 | (2006.01) | |
| G11B 27/34 | (2006.01) | |
| H04N 7/08 | (2006.01) | |

(52) U.S. Cl.
CPC .... *G11B 27/3072* (2013.01); *G06F 17/30855* (2013.01); *G11B 27/036* (2013.01); *G11B 27/34* (2013.01); *H04N 7/025* (2013.01); *H04N 21/4341* (2013.01); *H04N 21/4725* (2013.01); *H04N 21/8583* (2013.01); *H04N 21/8586* (2013.01); *H04N 7/08* (2013.01)

(58) Field of Classification Search
CPC ........... H04N 21/4622; H04N 21/4725; H04N 21/4788; H04N 21/235
USPC ....................... 725/34, 38, 43, 112, 113, 135
See application file for complete search history.

(56) References Cited

U.S. PATENT DOCUMENTS

| | | | |
|---|---|---|---|
| 5,918,012 A | 6/1999 | Grant | ............................ 709/217 |
| 6,102,406 A * | 8/2000 | Miles | ...................... A63F 9/183 |
| | | | 273/430 |
| 6,427,020 B1 | 7/2002 | Rhoads | ......................... 382/100 |

(Continued)

OTHER PUBLICATIONS

Hernandez-Avalos et al., "Video Watermarking Scheme Resistant to MPEG Compression," Circuits and Systems 2009, MWSCAS '09, 52$^{nd}$ IEEE International Midwest Symposium on, Aug. 2, 2009, pp. 853-858.

(Continued)

*Primary Examiner* — Jivka Rabovianski
(74) *Attorney, Agent, or Firm* — Sunstein Kann Murphy & Timbers LLP

(57) ABSTRACT

Online video can now be supplied with hyperlinks that are associated with and move with objects in the video. However, online video players tend not to report an accurate frame number, and this results in poor synchronisation of the movement of the hyperlink and the object. We propose that a subset of the pixels in the frame be used to encode a numeric frame identifier.

12 Claims, 2 Drawing Sheets

(56) References Cited

U.S. PATENT DOCUMENTS

| | | |
|---|---|---|
| 6,912,726 B1 * | 6/2005 | Chen ................. G06F 17/30855 |
| | | 348/E5.105 |
| 7,249,367 B2 | 7/2007 | Bove et al. ..................... 725/60 |
| 2001/0023436 A1 | 9/2001 | Anand et al. ................... 725/32 |
| 2003/0140346 A1 * | 7/2003 | Maa ..................... H04N 5/4401 |
| | | 725/87 |
| 2003/0149983 A1 | 8/2003 | Markel .......................... 725/51 |
| 2010/0248787 A1 * | 9/2010 | Smuga ................. G06F 3/0482 |
| | | 455/566 |
| 2011/0088075 A1 | 4/2011 | Eyer ............................ 725/114 |

OTHER PUBLICATIONS

UK Search Report, dated Nov. 26, 2012, 1 page.
EP Extended Search Report, dated Dec. 17, 2013.

\* cited by examiner

ONLINE VIDEO DISTRIBUTION

FIELD OF THE INVENTION

The present invention relates to online video distribution.

BACKGROUND ART

Online video is now an established communication tool, being used for social purposes and for commercial marketing and other purposes. Indeed, the success of online video is such that content-enabled video services are being developed, allowing functionality to be co-delivered with the video such as clickable hyperlinks within the video frame, such as external links that lead the viewer to a specific website or other internet address, or popouts to display text or images, or play video or audio alongside or instead of the video previously being played.

U.S. Pat. No. 7,620,914 discloses the incorporation of clickable hyperlinks into a viewable video, sending the hyperlink data in a separate stream alongside the video data. The two are then re-united in the video player and the hyperlinks are displayed over the video data, allowing a user to click the hyperlink as and when desired.

U.S. Pat. No. 7,817,822 discloses a motion tracking system for such hyperlinks. This allows a user to associate the hyperlink with a specific feature in a frame of the video, following which the motion tracking system detects movement of that feature in subsequent frames and adjusts the position of the hyperlink accordingly. As a result, the hyperlink appears to "float" over the feature and follow it as it moves in the video. The hyperlink can therefore be associated with the feature, such as a link offering more information on or an opportunity to purchase the item forming that feature. Multiple hyperlinks can then be safely added to a video or video segment, with the meaning of each hyperlink remaining clear to a viewer at all times.

SUMMARY OF THE INVENTION

As U.S. Pat. No. 7,620,914 sends the hyperlink and the video data in separate streams, when the two streams are united a correlation needs to be made between the two so that they can be properly synchronised. If this cannot be done then a system based on U.S. Pat. No. 7,620,914 will not be able to display the video in correct synchronisation.

Most systems use the frame number of the video as a time code to identify current playback point of the video and hence identify the hyperlinks and other objects that should be displayed. However, we have found that most online video players do not in fact provide an accurate record of the frame number and thus the returned frame number information is likewise inaccurate. This inaccuracy is typically of the order of a few frames, such as up to about 5 frames, and is insignificant for most online purposes. It is significant in this context, however, and can lead to a distinct "lag" in the movement of hyperlinks over the displayed video.

We therefore propose a video data format comprising viewable video, associated hyperlink data comprising both link data and position data (which may include a location within or relative to the frame, and a size of any bounding box or other object) defining a position within the video frame that may change from frame to frame, and frame count information encoded as pixel data within the video stream. This enables the player to determine precisely where to position the hyperlink or tag, to ensure that the display of hyperlinks is correlated correctly with the video playback.

Thus, in a first aspect the present invention provides a video data file comprising a viewable video sequence comprising a plurality of frames, associated hyperlink data comprising at least link address information, and position data defining a plurality of positions within a plurality of respective video frames, wherein at least a plurality of the frames include a unique frame number indicia encoded as pixel data within the frame.

The hyperlink data and the viewable video can be delivered as separate streams, in which case the hyperlink data can include a frame number associated with each of the defined position data sets.

We prefer that the unique frame number is encoded in a plurality of pixels in the video frame. These can be a group of adjacent pixels, such as a rectangular area which can be located at a corner of the video frame, for example. Alternatively, a group of adjacent pixels arranged in a linear array can be used, such as a group located at an edge of the video frame.

The unique frame number indicia is ideally included in substantially all the frames of the viewable video. They can, if desired, be located in a non-viewable area of the video frame such as an area concealed by a menu item or icon.

In second aspect, the present invention provides a video player for online video, including a video decoder for interpreting and displaying a received viewable video stream comprising a sequence of frames, a hyperlink decoder able to receive and display over the displayed video stream hyperlink data comprising link address information and position data defining a plurality of positions within a plurality of respective video frames, wherein the player is further arranged to inspect a subset of the pixels of a frame to be displayed time to determine a unique frame number indicia encoded in the subset and use the thus determined frame number to select a hyperlink for display over the frame.

In a third aspect, the present invention provides a system for encoding online video arranged to receive a viewable video stream comprising a sequence of frames, receive hyperlink data comprising link address information and position data defining a plurality of positions within a plurality of respective video frames, encode a unique frame number indicia into at least the plurality of respective video frames by writing non-image data to a subset of the pixels of the frame, and combine the thus encoded video stream and the hyperlink data for download.

The thus encoded video stream and the hyperlink data can be combined to form a single downloadable stream, or sent as two correlated downloadable streams.

Finally, in its fourth aspect the present invention provides a video data format comprising a data stream including viewable video comprising a sequence of frames, associated hyperlink data comprising at least link address information, and position data defining a plurality of positions within a plurality of respective video frames, wherein at least a plurality of the frames include a unique frame number indicia encoded as pixel data within the frame.

BRIEF DESCRIPTION OF THE DRAWINGS

An embodiment of the present invention will now be described by way of example, with reference to the accompanying figures in which.

DETAILED DESCRIPTION OF THE EMBODIMENTS

Figure 1:
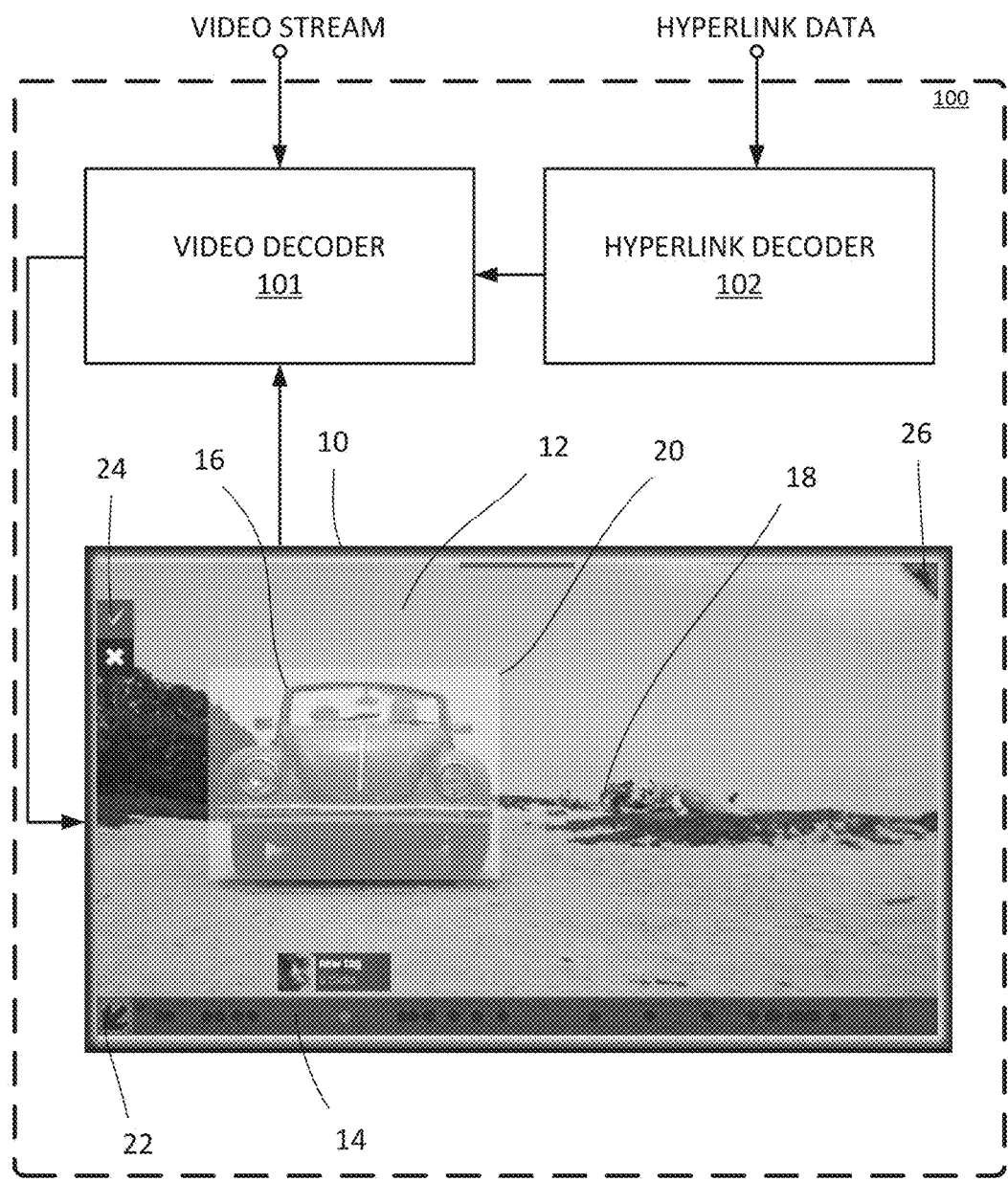
FIG. 1 shows an example of an online player window according to the present invention.

FIG. 1 shows an example of an online video player 100 according to the present invention including a video decoder 101 configured for interpreting and displaying a received viewable video stream comprising a sequence of frames, a hyperlink decoder 102 configured to be able to receive and display over the displayed video stream hyperlink data comprising link address information and position data defining a plurality of positions within a plurality of respective video frames. A video player window 10 comprises a video display 12 above a timeline 14 showing the progress of the current playback position through the length of the video. Within the video display 12, a viewable video stream is currently running and depicts a vehicle 16 on a beach 18.

A highlight area 20 is shown over the vehicle. This denotes a clickable hyperlink, which (as discussed above) may result in any of a variety of actions taking place when a user clicks within the highlight area. For example, there could be a pop-up box or window giving further details of the type of car and further information as to its provenance, or further photographs of the car, or one or more links to sites where cars of that type can be purchased.

The video display 12 also includes a number of operating icons. For example, a "full screen" icon 22 is shown adjacent the timeline 14 to allow a user to expand the video display to occupy the entirety of the screen of whatever device is being used for playback. After a preset period of inactivity, the timeline is made to disappear automatically, returning if the mouse pointer or other GUI input becomes active again. FIG. 1 also shows operating icons 24 which help the viewer navigate the tags. In addition, there is a flyout icon 26 in the upper right corner of the video display 12 which allows a user access to a wider range of control functions; clicking the flyout icon 26 causes additional icons for these control functions to be displayed. If present permanently, these icons could be distracting and would obscure part of the video, so they are normally hidden and only the flyout icon 26 is displayed permanently. This does obscure a part of the video, but only a small part and only in one corner; it is unusual for a corner location to contain crucial information.

Figure 3:
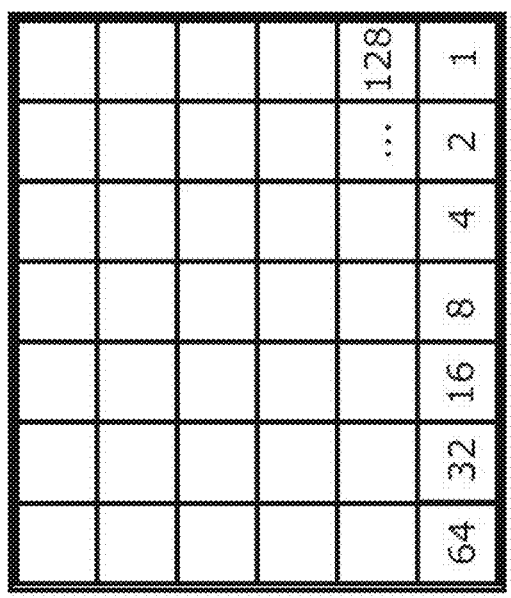
FIG. 3 shows the manner in which the frame number is encoded into the pixels of FIG. 2.
Figure 2:
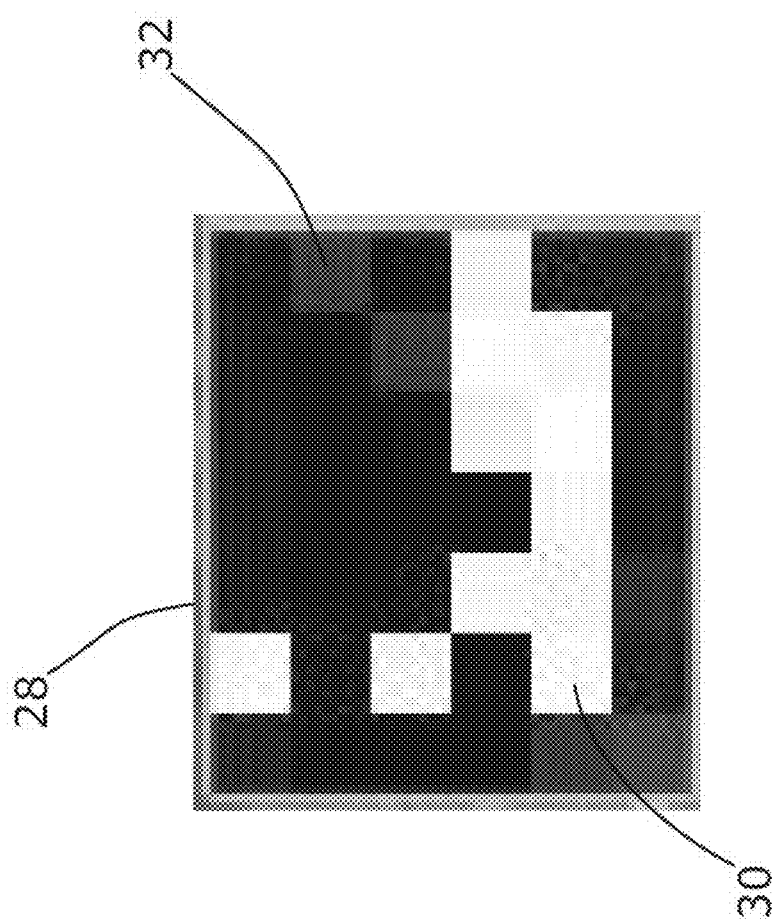
FIG. 2 shows a group of pixels encoding a frame number.

The part of the video stream that lies underneath this flyout icon 26 is therefore never seen. According to the present invention, the pixels beneath this icon are employed to store a time code instead of video data. An image of a typical time code is shown in FIG. 2, and is in the form of a 6×5 rectangular block 28 of pixels 30. Of this block, a 5×5 square group of pixels 32 are allowed to adopt an on (white) or off (black) state, and can thus encode a binary number according to the pattern shown in FIG. 3. This shows a least-significant-bit (LSB) on the bottom right hand corner of the rectangle with the bit values increasing to the left and upwards. This yields a single number encoded by the pixel values and which can be unique to each frame of a video. Thus, it can be used to indicate a time associated with the frame, or a frame number. Thus uniquely identifies the frame concerned without ambiguity or approximation, and can therefore be used as a reference by which the correct hyperlink placement is identified.

In addition, a vertical strip of pixels 34 to the left of the 5×5 group 32 appear white, black, white, black, white from top to bottom. These pixels retain this pattern throughout the video and indicate to the player that the pixel time code exists. The chances of a chequered column of that arrangement appearing as part of the actual video frame is very unlikely, so the player first looks for this pattern in order to confirm that a pixel time code is present. Of course, a different pattern could be adopted, for example using a different pattern of light and dark pixels and/or a different size or shape; all that necessary for such a marker pattern is that it be known in advance and unlikely to appear in the actual video by chance.

If desired, the individual squares 32 which form the bit values of the time code could each be defined by a plurality of pixels in the video itself, rather than as individual pixels. In other words, the 6×5 and/or the 5×5 groups of squares could cover substantially more than a 6×5 block of pixels in the raw video data. This and the use of on/off black/white encoding could help the frame data to be resilient to typical video compression algorithms; while these algorithms may distort the squares slightly, they are unlikely to turn a square completely black (or white) when it was previously white (or black). FIG. 2 shows some squares such as square 32 which are slightly paler than others, but which are clearly intended to be black and are above a mid-grey threshold and can therefore be interpreted as black by a decoding algorithm.

A 5×5 block of pixels allows for 25 bits of data. This allows a unique frame number of up to about $3 \times 10^7$ which is more than adequate for even the longest video at the highest frame rate, corresponding to about 186 hours of video at 50 frames per second. If desired, a smaller block of squares could be used, which would take up less space and could be concealed by a smaller icon. Alternatively, a non-rectangular block could be used, such as a linear strip of squares which could be aligned along an edge of the video such as the top, bottom, or sides of the video. These could be cropped prior to display and hence remain invisible to the viewer.

Alternatively, a larger block of squares could be defined, providing more than 5×5 squares and hence allowing more data to be stored. This will probably be unnecessary for frame identification but would allow other data to be encoded such as (perhaps) the hyperlink data. This latter step might require the bit depth to be increased by allowing colour variation of the squares, but care would need to be taken to ensure this data survived video compression techniques.

This frame number reference can be incorporated into the video file during compression or other processing. The algorithm performing the processing can maintain a simple frame count and can be programmed to convert this into the appropriate pattern of squares. These can then be written onto the frame over whatever pixel values were there originally to create the necessary video data file which can then be stored together with (or in combination with) the hyperlink data.

When the video data is received for display, the code can be retrieved by the video player by interpreting the pixel data appropriately, returning a reliable frame number and allowing proper synchronisation of the hyperlink information.

It will of course be understood that many variations may be made to the above-described embodiment without departing from the scope of the present invention.

The invention claimed is:
1. A system for encoding online video comprising:
a video player for processing online video data, the video player including:

i. a video decoder configured to receive a viewable video stream comprising a sequence of viewable video frames,
ii. a hyperlink decoder configured to receive hyperlink data comprising at least link address information and position data defining a plurality of positions within a plurality of respective video frames, and
iii. a video display including a plurality of operating icons and configured to for user access to control functions for the viewable video stream, wherein the video player is configured to encode a unique frame number indicia into at least the plurality of respective video frames to generate an encoded video stream, wherein the unique frame number indicia unambiguously and exactly identifies a specific frame of the respective video frames and wherein the unique frame number comprises non-image pixel data in a group of adjacent pixels within the video frame, and wherein the group of pixels includes a number of pixels arranged in a predetermined pattern which:
i. is retained throughout the video,
ii. is distinguishable from pixels in the video frame adjacent to the group of pixels, and
iii. which indicates that the unique frame number indicia exists in that frame; and wherein the video player is configured to respond to user commands provided at the video display to combine the encoded video stream and the hyperlink data for download wherein the encoded video stream and the hyperlink data are displayed simultaneously on the video display.

2. A system according to claim 1, wherein the hyperlink data includes a frame number associated with each of the defined positions.

3. A system according to claim 1, wherein the group of adjacent pixels defines a rectangular area.

4. A system according to claim 3, wherein the rectangular area is located at a corner of the viewable video frame.

5. A system according to claim 1, wherein the group of adjacent pixels is arranged in a linear array.

6. A system according to claim 5, wherein the linear array is located at an edge of the viewable video frame.

7. A system according to claim 1, wherein the position data includes a location within the viewable video frame.

8. A system according to claim 7, wherein the position data includes information relating to the size of the hyperlink.

9. A system according to claim 1, wherein the unique frame number indicia is included in all of the frames.

10. A system according to claim 1, wherein the predetermined pattern of pixels is located in an area of the video frame which is obscured and non-viewable when the video stream is displayed.

11. A system according to claim 1, wherein the encoded video stream and the hyperlink data are combined to form a single downloadable stream.

12. A system according to claim 1, wherein the encoded video stream and the hyperlink data are combined to form at least two correlated downloadable streams.

\* \* \* \* \*

UNITED STATES PATENT AND TRADEMARK OFFICE
CERTIFICATE OF CORRECTION

PATENT NO.        : 9,934,822 B2
APPLICATION NO.   : 14/482130
DATED             : April 3, 2018
INVENTOR(S)       : Steven James Callanan Page 1 of 1

It is certified that error appears in the above-identified patent and that said Letters Patent is hereby corrected as shown below:

In the Claims

In Column 5, Line 9:
Replace "configured to for"
With --configured for--

Signed and Sealed this
Ninth Day of October, 2018

Andrei Iancu
*Director of the United States Patent and Trademark Office*